J. C. TALLMAN.

BOSOM-PADS.

No. 7,737. Reissued June 12, 1877.

Witnesses
John Becker
Fred Haynes

Inventor
John C. Tallman
by his Attorneys
Brown & Allen

N. PETERS, PHOTO-LITHOGRAPHER, WASHINGTON, D. C.

UNITED STATES PATENT OFFICE.

JOHN C. TALLMAN, OF NEW YORK, N. Y.

IMPROVEMENT IN BOSOM-PADS.

Specification forming part of Letters Patent No. 185,362, dated December 12, 1876; reissue No. 7,737, dated June 12, 1877; application filed May 26, 1877.

*To all whom it may concern:*

Be it known that I, JOHN C. TALLMAN, of the city and State of New York, have invented certain Improvements in Bosom-Pads, of which the following is a description, reference being had to the accompanying drawing, forming part of this specification.

My invention has for its object the supply of more durable, comfortable, and more conveniently adjustable bosom-pads than those heretofore used; and it consists in a bosom-pad composed of crossing or rad a' strips or plates and intervening gores.

The invention also consists in a combination, with two bosom-pads, of a flexible and adjustable connection, substantially as hereinafter described.

To secure an elasticity resembling the natural bosom I make the basis of the pads of soft and elastic plates or strips of a crossing or radial construction, and to which plates or strips the other parts employed are attached. When said base plates or strips are made of cork, which material has heretofore been differently employed in the manufacture of bosom-pads, I obviate difficulties hitherto attending the use of cork alone for this purpose, as, for instance, irritation by pressure of its edges on the breast, and the liability of such material to crack when in the form of perforated plates unstrengthened by other tougher materials.

Figure 1:
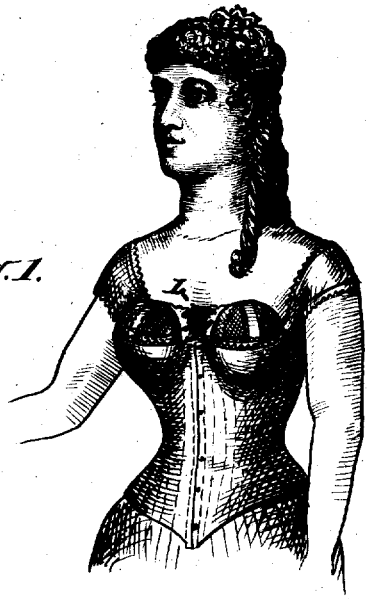
Figure 2:
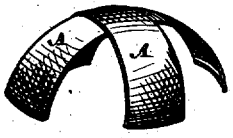
Figure 3:
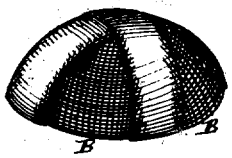
Figure 4:
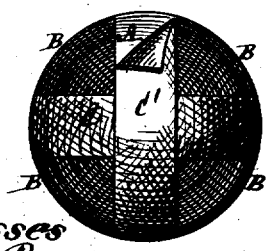

Figure 1 in the accompanying drawing represents my improved bosom-pads placed upon a female bosom as they are designed to be worn. Fig. 2 shows a crossing arrangement of the soft and elastic plates or strips which constitute the basis for the pads. Fig. 3 shows said plates or strips with intervening gores attached to said strips. Fig. 4 shows a pad in a still further advanced stage of manufacture, and Fig. 5 shows a finished pad.

A A are thin plates or strips of soft and elastic material, and of a crossing or radial construction. These base-strips, which may be lined or faced with muslin, may then be pressed in or on a mold or former to give them the required concavity on the inner side, or convexity on the outer side. Flexible gores B, Figs. 3, 4, and 5, are then placed in position between the strips A A, and attached thereto. When the base plates or strips A A are of cork, muslin strips C C′ may be pasted upon said plates. Borders *b*, Fig. 5, may or may not then be secured upon the edges of the muslin strips C C′. These several parts may all be still more strongly attached to each other by through-and-through stitching. Any number of base plates or strips, with intervening gores B, may be used.

Figure 5:
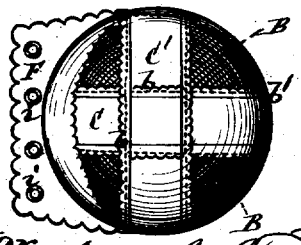

The pad may then be completed by securing to it an edge-binding, *b′*, and a flap, F, Fig. 5, said flap being provided with means or eyelets *i*, through which a cord or lace, L, Fig. 1, being passed, two pads may be flexibly and adjustably coupled together, as shown in Fig. 1, or otherwise equivalently connected. This arrangement provides a very convenient adjustment for two pads when worn, and the disposition of the fastening means or eyelets along the broad flap prevents the independent rotation and displacement of either pad.

The gores B, when of a reticulated construction, afford ample ventilation, and render the edges of the pads far more flexible, thus avoiding injurious pressure upon any part of the breast. Said gores also serve to hold together the base-plates A A, which give firmness as well as elasticity to the pad, as well as secure to it the required form, which the uniting-gores assist in preserving.

The several parts, constructed as described, may or may not be furnished with removable or attached outer flexible coverings, as desired.

I claim—

1. The combination, in bosom-pads, of the crossing or radial strips or plates and the intervening gores, substantially as and for the purposes set forth.

2. The combination, with two bosom-pads, of a flexible and adjustable connection, substantially as and for the purposes set forth.

JOHN C. TALLMAN.

Witnesses:
FRED. HAYNES,
BENJAMIN W. HOFFMAN.